Patented June 20, 1933

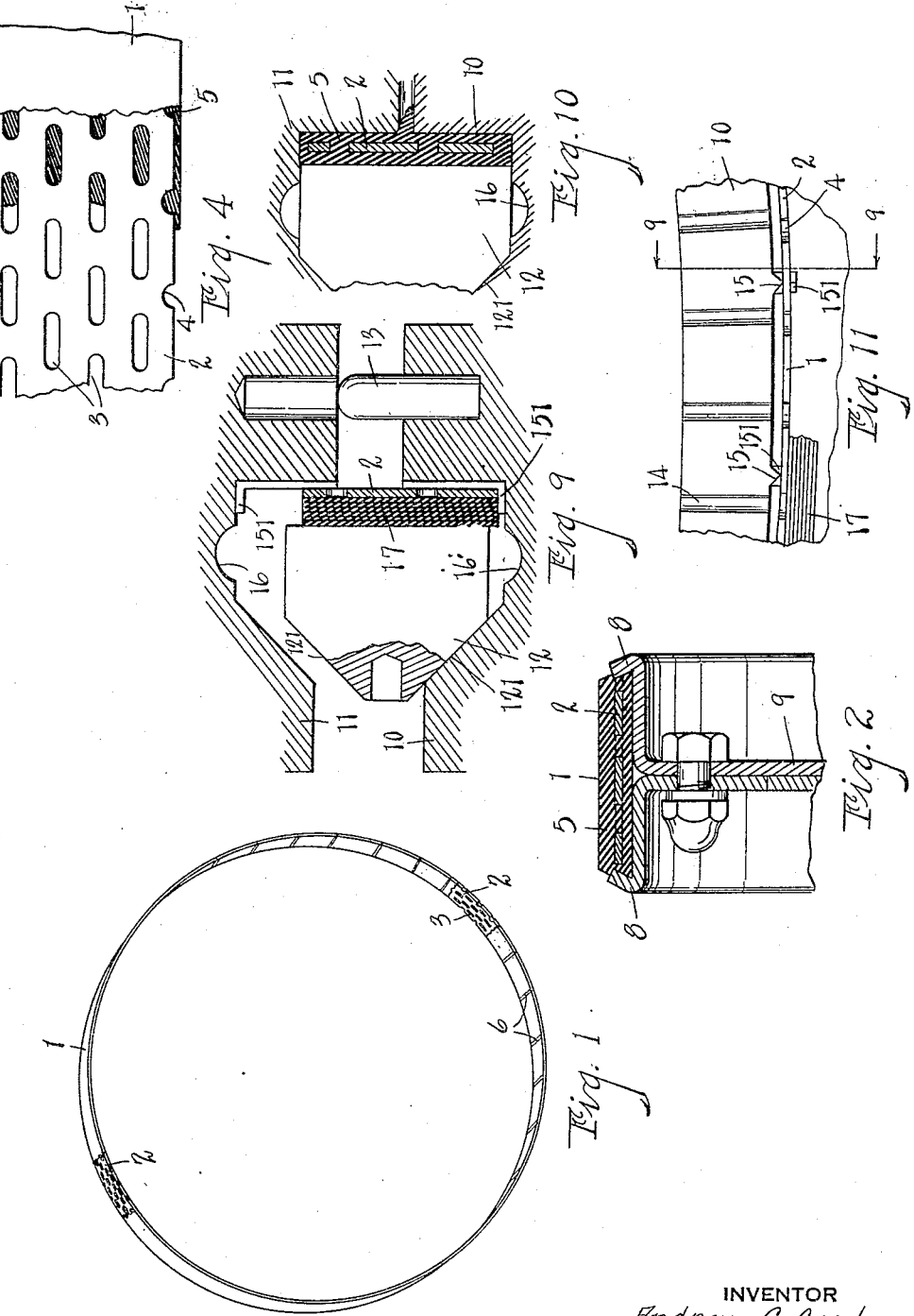

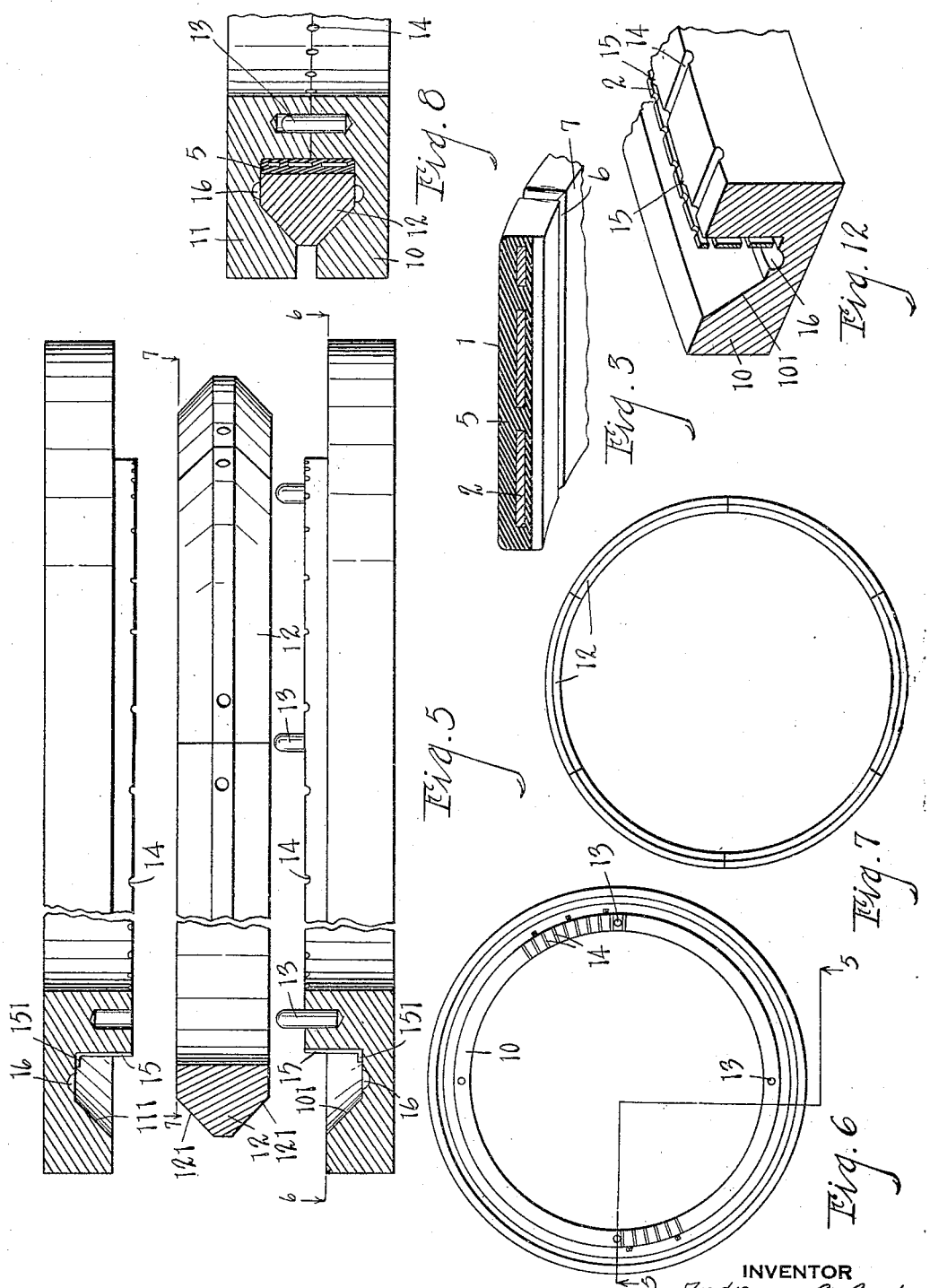

1,914,487

UNITED STATES PATENT OFFICE

ANDREW G. CARTER, OF GRAND RAPIDS, MICHIGAN, ASSIGNOR TO CARTER PRODUCTS COMPANY, INC., OF GRAND RAPIDS, MICHIGAN

APPARATUS FOR FORMING TIRES

Application filed May 31, 1930. Serial No. 458,810.

The objects of this invention are:

First, to provide such a tire for band saws which shall be perfectly and evenly balanced and cushioned and adapted to be effectively clamped and retained on the band saw wheel.

Second, to provide an improved apparatus and mold for the manufacture of such a tire.

Third, to provide an improved method of manufacturing such a tire.

Objects pertaining to economies of construction and operation will appear from the detailed description to follow.

My improved tire and apparatus for its manufacture are fully illustrated in the accompanying drawings, in which:

Fig. 1 is a detail view of a tire, portions of the cushion being broken away, embodying the features of my invention.

Fig. 2 is a cross section of my improved tire as supported on the rim of a band saw wheel such as illustrated in my co-pending patent application Serial No. 458,809, filed May 31, 1930, which has become Patent 1,811,916.

Fig. 3 is an enlarged perspective detail cross sectional view of a tire embodying the features of my invention, showing the scalloped cushion pads.

Fig. 4 is an enlarged detail of a section of tire in longitudinal section, showing the metal reinforcing core and the relation of the rubber cushion which has been extruded therethrough.

Fig. 5 is an enlarged detail view of the separated parts of the mold for forming my improved tire, the same being broken in section and cut in radial cross section to show details of the cross-section of the members or parts of the mold, being taken on a line corresponding to the irregular section line 5—5 of Fig. 6.

Fig. 6 is a reduced plan view of the lower member of the mold, taken on line 6—6 of Fig. 5.

Fig. 7 is a reduced plan view of the sectional ring member of the mold, taken on line 7—7 of Fig. 5.

Fig. 8 is a detail radial sectional view through the molds in closed position, the section being taken on the same section line as indicated for Fig. 6.

Fig. 9 is an enlarged detail radial sectional view of the cooperating parts of the molds, taken on the same section line as Fig. 5, and also on section line 9—9 of Fig. 11, the mold being in separated position with the tire reinforcement and rubber located within the mold ready for the application of pressure and heat to vulcanize the same.

Fig. 10 is an enlarged detail of the mold as seen in Fig. 9, in closed position showing the manner of extrusion of the rubber through the reinforce band and the method of molding.

Fig. 11 is an enlarged detail plan view of a section of the bottom mold ring as seen in Fig. 6, enlarged with the metal reinforcement band and rubber disposed thereon in position ready for molding, showing the details of the spacing support therefor.

Fig. 12 is an enlarged detail perspective view of part of the bottom roll with the reinforcing band in place.

The parts will be identified by their numerals of reference which are the same in all the views.

1 is the rubber cushion tire. 2 is the continuous metallic reinforcing band within the body of the tire. This is perforated with longitudinal slots 3 which are parallel and in staggered relation. The edges at intervals between and corresponding to the slots are provided with semi-circular notches 4.

5 is the rubber cushion of the tire, vulcanized onto the reinforcing band, being extruded through the band in the vulcanizing operation. The interior of the tire is creased by transverse creases or grooves at 6 which form the interior of the same into separate transverse yielding cushion pads 7.

The tire is adapted to be clamped between tire holding flanges 8, 8 on wheel 9 as seen in Fig. 2. These clamps compress the rubber strongly against the sides of the reinforce band 2 but the rubber cushion 5 is retained in place by the portion disposed within the said notches 4 so that no matter how strongly this tire is clamped, the rubber cushion is effectively retained upon the reinforcing band and is not split off.

The tire is formed by special molds, there being an annular bottom mold 10, a precisely symmetrical corresponding top mold 11, and an intermediate segmental ring mold 12. The top and bottom molds are suitably guided together by dowels 13. Vent openings 14 are made opening radially inward from the mold. The periphery of the mold part is adapted to receive and form the interior face of the tire.

It is provided with vertical V-shaped ribs 15 having outturned ends 151 at the bottom of each mold projecting about one-sixteenth of an inch radially outward, more or less.

Overflow annular grooves 16 are provided in each mold 10 and 11. The mold 12 is here shown divided into six segments. It might possibly be divided into three, or the number might be increased. Radial holes for handling hooks or pins are provided within an inch or so of each end of each segment. The interior of each segment is flat to form the exterior of the tire into a true contacting surface for a band saw.

In manufacture, the unvulcanized rubber 17 is wrapped onto the exterior of the reinforcing metal band 2 in sufficient quantity to form the cushion for the tire.

The reinforcing strip with the rubber thereon is then placed in the bottom mold 10 with the metal contacting with the ribs 15 and resting on the projecting lugs 151, in spaced relation from the face of the interior forming mold.

The segmental ring 12 is then dropped in back of it. This is chamfered on its exterior surface at 121, 121 and recesses for this mold in the bottom mold 10 are chamfered at 101 and in the upper mold at 111, so that as the top and bottom molds are forced together by the press, they drive, by the inclined plane action, the segmental ring 12 radially inward.

As heat is applied during this process, the rubber first becomes soft and extrudes through the reinforcing band 2, is completely formed and, with the increase in temperature, is completely vulcanized, forming a perfect tire with an even distribution of the cushioning rubber outside and in.

When this tire is placed upon a band saw wheel and clamped in place, the rubber, by its intimate engagement with the reinforcing band, distributes the strain and a perfect even working tire and band wheel is the result.

I desire to claim my improved tire broadly. I also desire to claim the special molds for producing the same and the method of manufacture, both specifically and boardly as pointed out in the appended claims.

Having thus described my invention what I claim as new and desire to secure by Letters Patent is:

1. An apparatus for forming tires having a reinforcing perforated core, comprising an annular bottom mold having a recess therein and having an inner peripheral molding surface divided by transverse ribs with end lugs projecting within the mold space to form supports for said core and provided with inwardly opening radial vents, an identical symmetrical annular top mold suitably doweled to the said bottom mold the recesses of the said molds being chamfered at their outer surfaces, a mold ring divided into segments adapted to force the layer of rubber to be molded radially inward, the interior surface of which is conformed to form the periphery of the tire and the periphery of which ring is chamfered above and below to correspond to the chamfered recesses of said top and bottom molds, whereby in operation when the molds are heated and compressed the rubber is compressed by said segmental ring mold and extruded through the said tire reinforcing core and conformed and vulcanized.

2. An apparatus for forming tires having a reinforcing perforated core, comprising an annular bottom mold having a recess therein and an inner peripheral molding surface having inwardly projecting core supports, an identical symmetrical annular top mold suitably doweled to the said bottom mold the recesses of the said molds being chamfered at their outer surfaces, a mold ring divided into segments adapted to force the layer of rubber to be molded radially inward, the interior surface of which is conformed to form the periphery of the tire the periphery of which ring is chamfered above and below to correspond to the chamfered recesses of said top and bottom molds, whereby in operation when the molds are heated and compressed the rubber is compressed by said segmental ring mold and extruded through the said tire reinforcing core and conformed and vulcanized.

In witness whereof I have hereunto set my hand.

ANDREW G. CARTER.